US006899120B1

(12) United States Patent
Motley

(10) Patent No.: US 6,899,120 B1
(45) Date of Patent: May 31, 2005

(54) YARD HYDRANT

(75) Inventor: Charles B. Motley, Stoughton, WI (US)

(73) Assignee: Baker Manufacturing Company, Evansville, WI (US)

( * ) Notice: Subject to any disclaimer, the term of this patent is extended or adjusted under 35 U.S.C. 154(b) by 0 days.

(21) Appl. No.: 10/841,655

(22) Filed: May 7, 2004

(51) Int. Cl.[7] .............................. E03B 9/04; E03B 9/14; F16K 24/02; F16K 31/524; F16K 35/02
(52) U.S. Cl. ...................... 137/218; 137/281; 137/287; 137/292; 137/301; 137/315.11; 137/315.41; 251/95; 251/104; 251/244; 251/263
(58) Field of Search ................................ 137/217, 218, 137/281, 282, 287, 288, 301, 292, 315.11, 137/315.41; 251/95, 101, 102, 104, 242, 251/244, 251, 263

(56) References Cited

U.S. PATENT DOCUMENTS

| | | | | |
|---|---|---|---|---|
| 609,805 A | * | 8/1898 | Hardy | 137/281 |
| 1,937,667 A | * | 12/1933 | Parsley et al. | 137/281 |
| 2,664,096 A | | 12/1953 | Murdock et al. | 137/282 |
| 3,566,905 A | * | 3/1971 | Noland | 137/301 |
| 3,581,761 A | * | 6/1971 | Noland | 137/307 |
| 3,770,003 A | * | 11/1973 | Uroshevich | 137/281 |
| 3,926,206 A | * | 12/1975 | Anderson et al. | 137/281 |
| 3,926,207 A | | 12/1975 | Anderson et al. | 137/281 |
| 4,096,877 A | * | 6/1978 | Arledge, II | 137/281 |
| 4,282,895 A | * | 8/1981 | Young | 137/281 |
| 4,475,570 A | * | 10/1984 | Pike et al. | 137/218 |
| 4,653,521 A | * | 3/1987 | Fillman | 137/218 |
| 5,129,416 A | * | 7/1992 | Ackroyd | 137/218 |
| 5,261,441 A | * | 11/1993 | Anderson | 137/281 |
| 5,701,925 A | | 12/1997 | Mulligan et al. | 137/282 |
| 6,047,723 A | | 4/2000 | Hoeptner, III | 137/281 |
| 6,178,988 B1 | | 1/2001 | Royle | 137/288 |
| 6,427,716 B1 | * | 8/2002 | Hoeptner, III | 137/281 |

* cited by examiner

Primary Examiner—George L. Walton
(74) Attorney, Agent, or Firm—Quarles & Brady LLP

(57) ABSTRACT

A yard hydrant has an elongated wet pipe with a plunger that seals against the inside of a well casing. Lifting a pivoting handle at the top of the wet pipe lowers the wet pipe which opens a normally closed supply valve. Pressurized water can then flow up the wet pipe and out of a nozzle head mounted to the upper end of the wet pipe. Lowering the handle pulls the wet pipe upward, thereby clearing it from the supply valve which is spring biased to shut off the water supply. The handle has a cam that positively actuates a normally closed anti-siphon valve so that water left in the wet pipe can fall under gravity to a collection chamber within the well casing beneath the piston. Lifting the handle again lowers the wet pipe and forces the water in the collection chamber back up the wet pipe. At the same time, the anti-siphon valve will close and the wet pipe re-opens the supply valve.

23 Claims, 4 Drawing Sheets

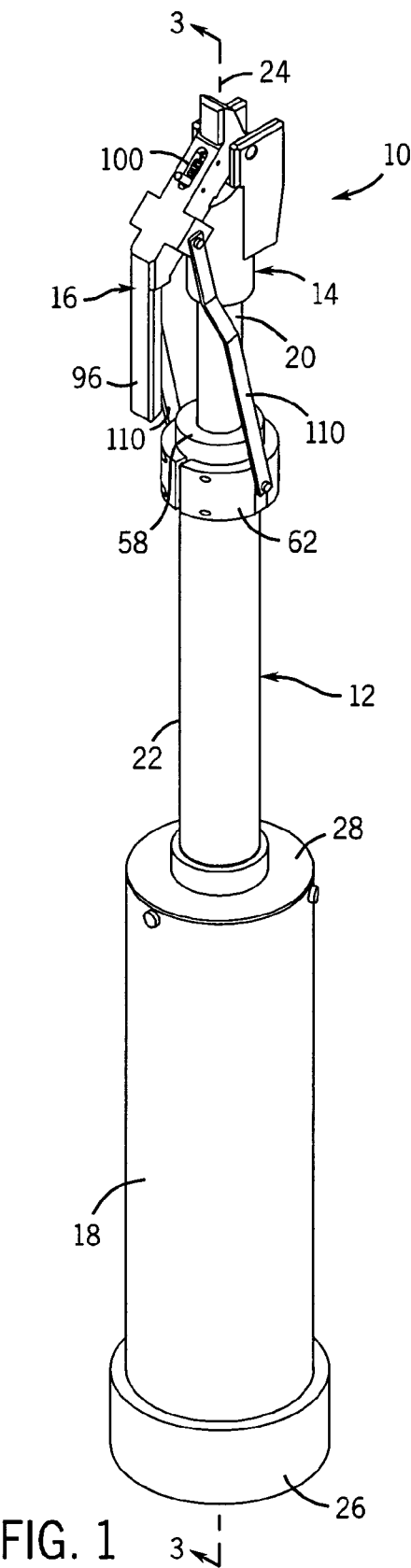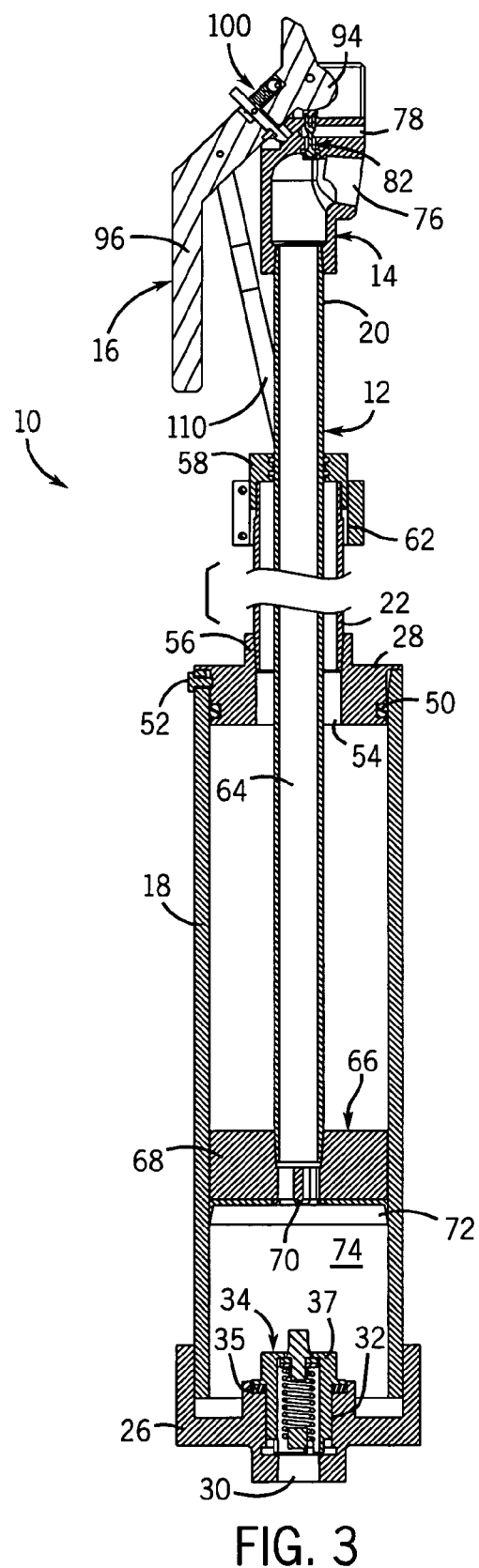

YARD HYDRANT

CROSS-REFERENCE TO RELATED APPLICATIONS

Not applicable.

STATEMENT OF FEDERALLY SPONSORED RESEARCH OR DEVELOPMENT

Not applicable.

BACKGROUND OF THE INVENTION

The present invention relates to hydrants and more particularly to freeze-resistant in-ground sanitary yard hydrants.

Yard hydrants are installed in water systems to provide water sources remote from buildings. In low temperature climates, such as the mid-west and east coast of the United States, the water lines are buried below the frost line to prevent them from freezing and bursting. Similarly, the lower ends of the hydrants are buried below the frost line to prevent damage to the hydrant arising from freezing. Because the water must reach above ground, the upper part of the hydrants extends up through and above the ground (above the frost line), and is thus subject to the adverse effects of low temperatures.

Typical yard hydrants have a main water supply valve, a dry pipe, a wet pipe and an activation handle. The dry pipe is secured to the main valve housing where the water line is connected below the frost line. The dry pipe then extends up through the ground to a comfortable operating position above ground level. The wet pipe is positioned within the dry pipe and its lower end activates the main valve to turn off and on the water supply. The handle is mounted to the top end of the dry pipe and is linked to the upper end of the wet pipe to raise and lower the wet pipe and thereby control the valve from above ground. The upper end of the wet pipe has a spigot which can connect to a hose or spray out the water directly. To turn off the hydrant, an operator moves the handle to move the wet pipe and close the valve. Any water in the wet pipe will drain out of the hydrant below the frost line, and thereby prevent water from freezing within the hydrant. U.S. Pat. No. 6,178,988 discloses one such hydrant design.

One problem with such hydrants is the presence of the drain to evacuate the water in the hydrant. The drain opening raises two concerns. First, if water is drained from the hydrant it may be necessary to create a drain field so that the water does not accumulate around the hydrant. This makes installation much more labor intensive, time consuming and costly. Also, dispensing water underground may be regulated in certain areas. Second, the drain opening provides an entry point for underground contaminants into the hydrant, which can make the water dispensed by the hydrant less sanitary. This second issue is particularly a problem when valve seals become worn, dislocated or less resilient.

U.S. Pat. No. 6,047,723 discloses a hydrant that collects the water left in the hydrant after it is turned off in a cylinder installed below the frost line. The water collected in the cylinder is purged by a piston back up through the hydrant when the water supply is turned on again. The disclosed hydrant includes a drain opening that is ordinarily isolated from the water collected in the cylinder by one or more o-rings such that normally no water is drained underground. However, should an o-ring fail the water collected water would leak underground. If the o-ring failed while the water supply was on, supply water could be diverted from the hydrant, which could not only flood the area underground surrounding the hydrant but also reduce the water pressure leaving the hydrant above ground.

To avoid these concerns, no-drain hydrants have been devised (see e.g., U.S. Pat. Nos. 3,936,207 and 5,701,925). In such no-drain hydrants, water left in the upper part of the hydrant is collected in a well chamber of the hydrant below the frost line. This chamber is enclosed with no openings (other than for the supply water inlet) that could cause leakage or be an entry point for contamination. Since the chambers are enclosed it is possible for a vacuum to form inside the hydrant which can cause two problems. First, the vacuum can pull water back into the hydrant from a hose or other attachment, which can impact the sanitization of the water and may be prohibited by regulation in certain areas. Second, the vacuum can impede or prevent all of the water left in the hydrant from draining into the well chamber. Water can thus remain above the frost line and freeze, thereby leading to damage or failure of the hydrant.

U.S. Pat. No. 3,926,207 discloses a hydrant having a pair of check valves located in the head of the hydrant (above ground) that will vent the collection chamber to ambient. The check valves are normally open so that the hydrant is vented when off. Water pressure closes the valves when the hydrant is on. One problem with this design is that there is no positive actuation of the valves to ensure they open to vent the hydrant. The check valves in the disclosed hydrant are spring flapper type valves that are biased open. The spring force is overcome by the force of the pressurized water, which when shut off allows the check valves to re-open. Such a valve arrangement is prone to failure, particularly when the air temperatures are below freezing, in which case water on and around the check valves can freeze causing ice to build up on or around the valves, which can disrupt the seal or hold them closed. The result of this is that the water either sprays through the check valves or the check valves fail to vent the collection chamber causing the aforesaid back siphon problems.

SUMMARY OF THE INVENTION

The inventors of the present invention have recognized that in-ground hydrants should have an integral positively actuated anti-siphon valve to prevent back siphon from the well casing and better ensure that all the water in the hydrant properly collects in the well casing (below the frost line) when the hydrant is not operating. The hydrants should also be designed so that they can be installed and serviced more readily from above the ground. The inventors determined that this aim can be furthered by avoiding side feed valve arrangements, for example instead using straight or axially aligned feed valves. It has also been recognized that maintenance of the hydrants and underground leakage can be reduced significantly by reducing or eliminating components that tend to fail over time.

Consistent with the above, in at least one embodiment the hydrant of the present invention includes a handle, an elongated wet pipe, a well casing, a supply valve and an anti-siphon valve. The wet pipe is movable and defines a flow passage between open ends. One end has a plunger head that slidably seals against the inside of the well casing to define a collection chamber that is in fluid communication with the flow passage of the wet pipe and a supply opening having a supply valve actuated by the wet pipe. The anti-siphon valve is actuated by the handle to vent the collection chamber to ambient.

In other preferred embodiments of the hydrant, the anti-siphon valve is normally closed by a spring, but is opened (when the supply valve is closed) by direct contact with the handle when the handle is in an "off" position. More preferably, the handle includes a valve cam positioned to contact and open the anti-siphon valve when the handle is in the off position. The valve cam can be a convex surface of the handle, and can pivot with the handle to release or clear the anti-siphon valve when the handle is in an "on" position. Like the anti-siphon valve, the supply valve can also be spring biased closed.

Thus, when the wet pipe is lowered so that the hydrant is in the on position, it will force the supply valve open against the spring to allow water to flow up into the wet pipe. When the hydrant is on, the anti-siphon valve will be in its normally closed state. When the wet pipe is raised up clear of the supply valve so that the hydrant is off, the supply valve will close on its own to shut off the water supply. The valve cam will then contact an unseat the anti-siphon valve and hold it open. This will vent the collection chamber (via the wet pipe) to ambient so that there is no back siphon out of the hydrant or any pressure that would prevent the water in the wet pipe from flowing under gravity to the collection chamber. Note that as the wet pipe moves up off of the water valve, the collection chamber will increase in volume until the wet pipe returns to its highest position when the hydrant is off. In this position, the collection chamber will be large enough to hold all of the water left in the wet pipe.

In other embodiments, the wet pipe, well casing and supply valve are all centered along a longitudinal (or vertical) axis. This gives the hydrant a slender profile and a small footprint allowing the hydrant to be installed in a small hole. Preferably, the well casing is a single cylindrical tube with an outer surface defining an exterior of the hydrant and an inner surface defining the collection chamber. The bottom and top of the well casing is capped and the bottom end cap contains the supply valve. Water in the collection chamber is displaced by the plunger head, which preferably includes a pusher plate and a cup seal, back up through the wet pipe when the hydrant is on. Also, the supply valve is preferably a self-contained cartridge that threads in place at the bottom of the well casing. It can be serviced, installed and replaced from above ground using a long socket wrench.

In still other embodiments, the hydrant has a nozzle head at the upper end of the wet pipe, which preferably mounts the handle. A pair of links extend between and pivotally connect the handle and a fixed collar member. Lifting (pivoting upward) the grip end of the handle causes the links to push the wet pipe down onto the supply valve to turn the hydrant on. Pushing down (pivoting downward) the handle cause the links to lift the wet pipe up off of the supply valve. As mentioned, in this position the valve cam of the handle engages the anti-siphon valve to vent the wet pipe and collection chamber. The anti-siphon valve is preferably an integral part of the nozzle head. Specifically, it is positioned in a small passage between a vent opening to ambient and the main outlet passage, which communicates with the wet pipe at all times. Any time the hydrant is off, the anti-siphon valve is held open by the cam to vent the wet pipe.

These and other advantages of the invention will be apparent from the detailed description and drawings.

BRIEF DESCRIPTION OF THE DRAWINGS

FIG. 1 is a perspective view of a yard hydrant according to the present invention;

FIG. 3 is sectional view taken along line 3—3 of FIG. 1 of the hydrant in an "off" position;

DETAILED DESCRIPTION OF THE PREFERRED EMBODIMENT

Figure 2:
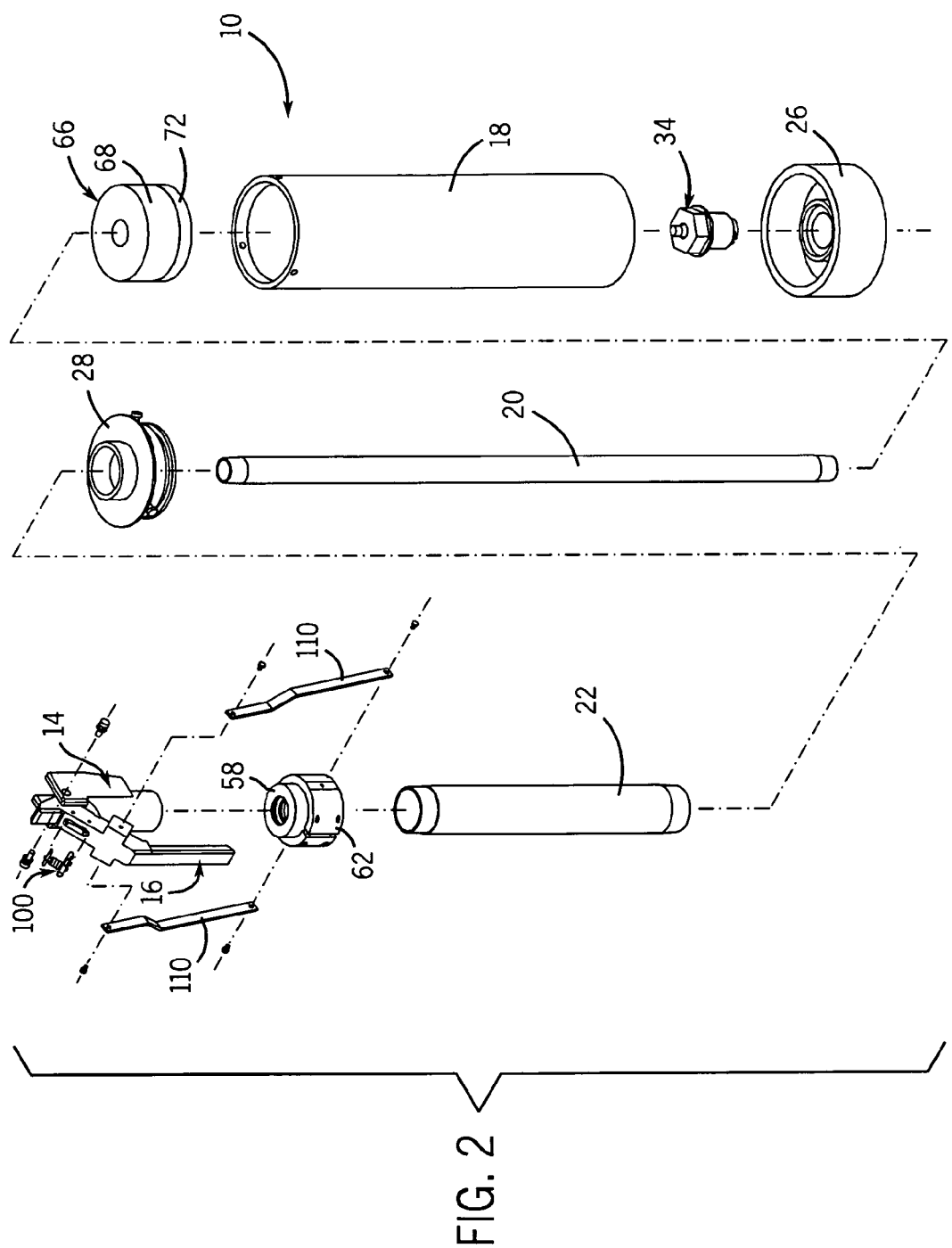
FIG. 2 is an exploded assembly view thereof.

Referring now to the drawings wherein like reference characters represent corresponding elements throughout the several views, the present invention will be described in the context of an exemplary yard hydrant 10. Referring to FIG. 1, the hydrant 10 generally includes a pipe assembly 12, a nozzle head 14 and a handle assembly 16.

As shown in FIG. 2, the pipe assembly 12 includes a well casing 18, a wet pipe 20 and a stand pipe 22 all being generally elongated cylinders concentric with axis 24 made of PVC or galvanized metal. The well casing 18 has the largest diameter and is capped at both ends by end caps 26 and 28. Lower end cap 26 fits over the bottom end of the well casing 18 and defines a supply opening 30 concentric with the axis 24 to which a water supply line (not shown) is coupled by any suitable means. The lower end cap 26 also defines a threaded pocket 32 in which a supply valve cartridge 34 is threaded. The valve cartridge 34 housing is preferably made of plastic, such as nylon, having good sealing properties.

A rubber gasket 35 is disposed at the interface between the valve cartridge 34 and the lower end cap 26. An upper end of the valve cartridge 34 defines a hex head 37 (best seen in FIG. 2) which fits into the socket (not shown) of an elongated tool for turning the valve cartridge 34. The socket preferably has detents that snap onto the hex head 37 so that the valve cartridge 37 can be lowered into the well casing 18 and raised up out of the well casing 18 at the end of the socket from above ground through an upper end of the well casing 18.

Figure 7:
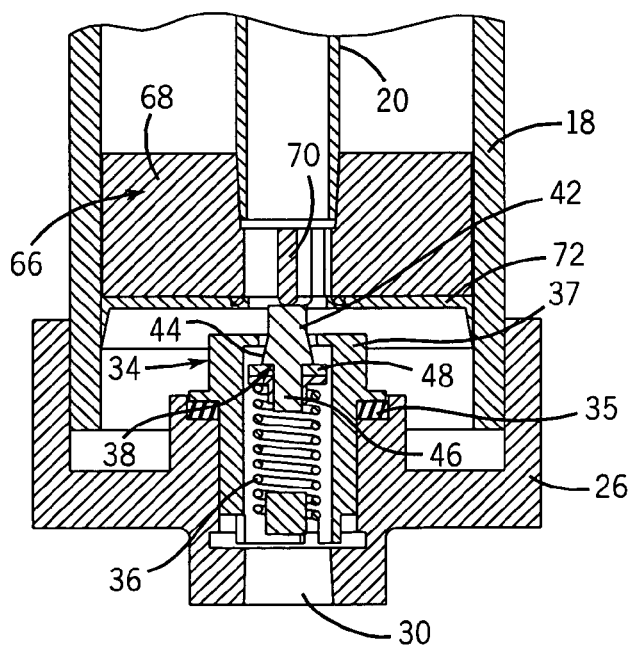
FIG. 7 is an enlarged sectional view showing a supply valve opened by the lower end of the wet pipe when the hydrant is in the on position shown in FIG. 3.

As best seen in FIG. 7, the valve cartridge 34 includes a spring 36 that biases a brass valve head 38 against a valve seat 40. The valve head 38 has an upper portion 42 that projects axially up through the valve seat 40, a tapered circumference section 44 and a stem 46 (about which the spring 36 fits) mounting a pair of annular seals 48. The tapered section 44 of the valve head 38 creates a line seal with the inner diameter of the valve seat 40 and seals 48 create a surface seal (see FIG. 3). The supply valve 34 is normally closed because the spring 36 holds the valve head 38 against the valve seat 40 (as shown in FIG. 3) in the absence of a downward axial force. When the valve head 38 is forced axially downward against the spring 36, the valve head 38 unseats so that the water supply opening 30 is in communication with the bottom of the well casing 18 (see FIGS. 5 and 7).

Referring to FIGS. 1–3, the upper end of the well casing 18 is capped by the upper end cap 28 which fits down into the top of the well casing 18 and mounts an o-ring seal 50 sealing against the inner diameter of the well casing 18. Three fasteners 52 secure the upper end cap 28 to the well casing 18. These fasteners can be removed to remove the upper end cap 28 and allow access inside of the well casing 18 for service from above the ground. The upper end cap 28 has an axial opening 54 through which the wet pipe 20 slides and a short cylindrical section 56 in which fits a lower end of the stand pipe 22, secured fixed in any suitable manner. The upper end of the stand pipe 22 is capped by end cap 58 having an axial opening 60 for the wet pipe 20. A split metal collar 62 is clamped around the end cap 58.

The wet pipe 20 has the smallest diameter, which defines an internal flow passage 64. The lower end of the wet pipe 20 has a plunger 66 secured thereto which is made up of an annular, preferably PVC, pusher 68, which has a septum 70 in the middle, and a downwardly opening cup seal 72, made of a suitable reinforced rubber or other elastomeric material, slidably sealing against the inner diameter of the well casing 18. The space defined by the cup seal 72, the well casing 18 and the lower end cap 26 defines a collection chamber 74, which has a variable volume that expands and contracts as the wet pipe 20 is moved along the axis 24, as described below.

The collection chamber 74 portion of the hydrant 10 must be located below the frost line to avoid freezing of the hydrant 10. This depth varies by region, however in the mid-west United States for example, it is about 3–6 feet below ground. The length of the well casing 18 is thus a function of this bury depth plus an additional height above ground height, typically 12–18 inches. The length of the wet pipe 20 varies as well and is typically several inches longer than the well casing 18. The stand pipe 22 is a set length, 10 inches for example.

The upper end of the wet pipe 20 mounts the nozzle head 14 and the handle assembly 16. Referring to FIGS. 1–4, the nozzle head 14 is preferably cast iron and defines a right angle outlet passage 76 in communication with the wet pipe flow passage 64. A suitable connection can be provided at the outlet passage port to connect a hose or other implement, if desired. The nozzle head 14 also has a vent passage 78 opening to ambient air and leading to a short vertical passage 80 in which an anti-siphon valve 82 is disposed. The vertical passage 80 extends between the outlet passage 76 and the vent passage 78 so that when the anti-siphon valve 82 is open, the collection chamber 74 of the well casing 18 is vented to ambient via the wet pipe flow passage 64 and the outlet passage 76.

Figures 4, 5:
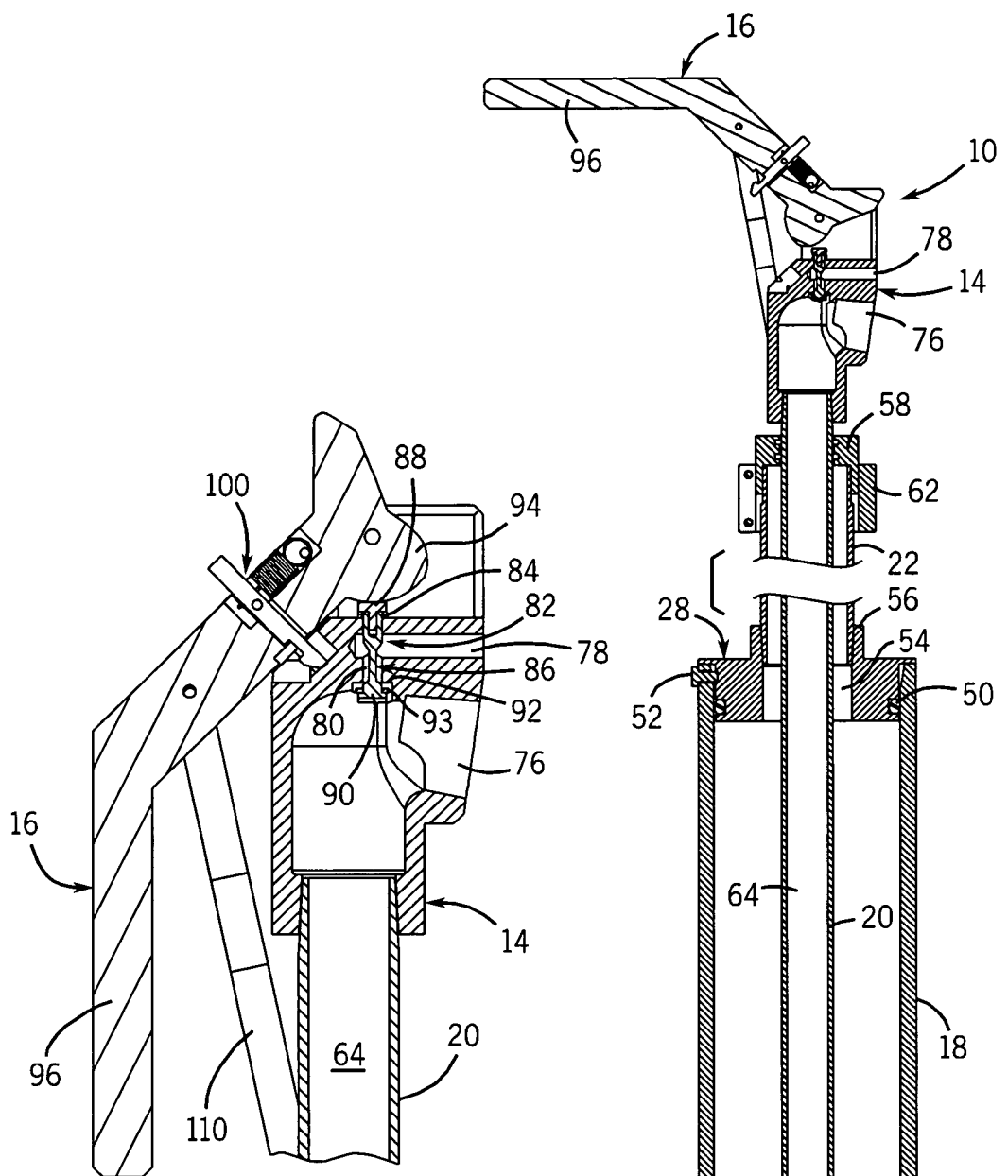
FIG. 4 is an enlarged sectional view showing a siphon valve opened by a cam when the hydrant is in the off position as shown in FIG. 3.
FIG. 5 is a sectional view similar to FIG. 3 albeit showing the hydrant in an "on" position.
Figure 6:
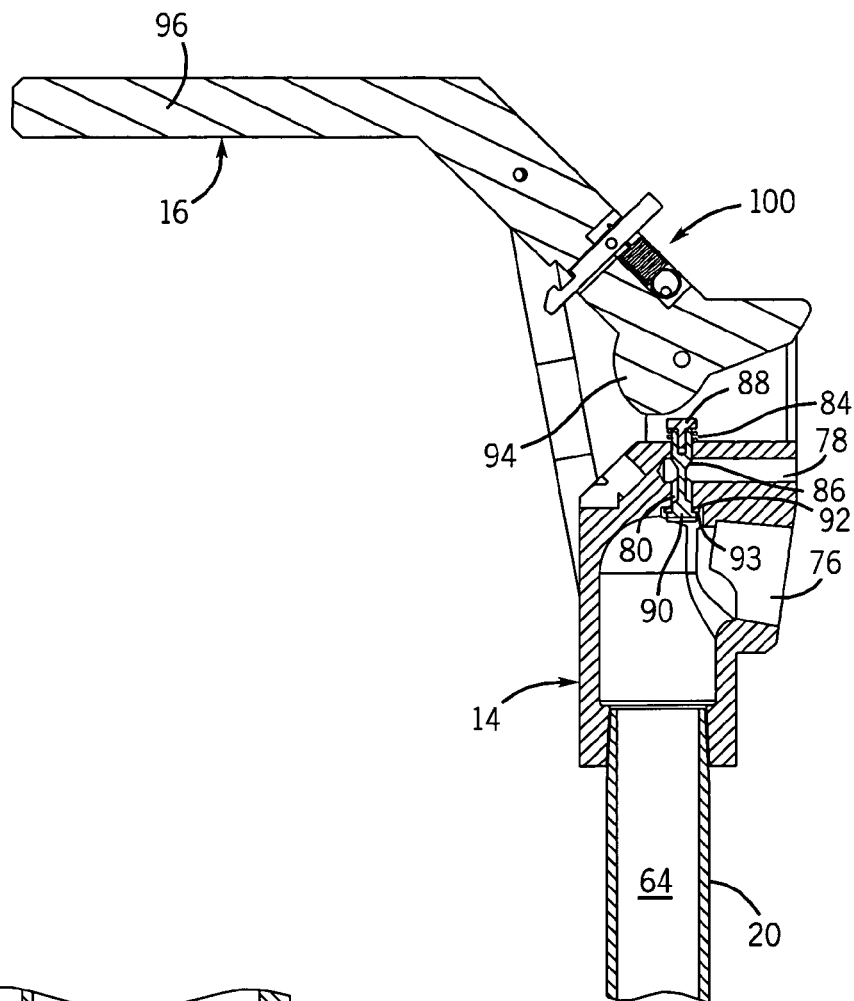
FIG. 6 is an enlarged sectional view showing the siphon valve normally closed as when the hydrant is in the off position shown in FIG. 5.

As shown in FIG. 6, the anti-siphon valve 82 includes a spring 84 that fits around a valve member 86 and bears against a surface of the nozzle head 14 and an upper end 88 of the valve member 86. The spring 84 biases the valve member 86 to seat a valve head 90 against a valve seat 92 and thereby isolate the vent passage 78 from the outlet passage 76. As shown in FIG. 4, the anti-siphon valve 82 is opened by contact of a valve cam 94 formed at the end of a handle member 96, which is preferably made of metal. The valve cam 94 is a convex surface of the handle 96 near the pivotal connection of the handle 96 to the nozzle head 14. When the handle 96 is down as shown in FIG. 4, the valve cam 94 physically contacts the upper end 88 of the valve member 86 and drives it downward to unseat the valve head 90 from the valve seat 92. The positive contact of the valve cam 94 ensures that the anti-siphon valve 82 will open and not be stuck closed. When the handle 96 is pivoted upward as shown in FIG. 6, the valve cam 94 pivots away from, and preferably clears, the upper end 88 so that the spring 84 can drive the valve member 86 upward to seat the valve head 88 against the valve seat 92. In the preferred embodiment shown, the valve head includes a rubber seal 93 creating a surface seal against the valve seat 92.

A small spring latch 100 disposed in a pocket in the handle 96 latches the handle 96 in the "off" position shown in FIG. 4 by engaging a surface of the nozzle head 14. By pushing the upper end of the latch with a thumb or finger, it can be dislodged from the nozzle head 14 so that the handle 96 can be pivoted upward to the on position shown in FIG. 6. The spring latch 100 automatically latches again when the handle 96 is returned to the off position.

The handle 96 is connected by a pair of metal links 110 to the collar 62. The links 110 can pivot as the handle 96 pivots, and because the collar 62 is fixed in place, the links 110 impart an axial motion to the wet pipe 20 and all the components connected thereto. Specifically, as the handle 96 is lifted up to the on position shown in FIG. 6, the wet pipe 20 moves vertically downward and as the handle 96 is pushed down to the off position shown in FIG. 4, the wet pipe moves vertically upward.

The hydrant 10 thus operates as follows. The hydrant 10 is off when as shown in FIG. 3. In this position, the normally closed supply valve 34 is closed so that no water from the water supply line can flow into the well casing 18 and out of the nozzle head 14. Any water that would have been left in the wet pipe 20 or the nozzle head 14 will have drained down into the collection chamber 74, which has a volume equal to or greater than that of the wet pipe 20 and the outlet passage 76 of the nozzle head 14. The anti-siphon valve 82 is held open by the valve cam 94 to prevent back siphon and relieve any vacuum that may prevent the water from draining freely under gravity to the collection chamber 74.

The hydrant 10 is turned on by lifting the handle 96 upward to the on position shown in FIG. 5. Doing so, drives the wet pipe 20 downward. The plunger 66 in turn drives the water in the collection chamber 74 up into the flow passage 64 of the wet pipe 20. When the wet pipe 20 is all the way down, the septum 70 contacts the upper part 42 of the valve head 38 so as to unseat it and open the supply valve 34. Pressurized water from the water supply line can thus flow into the hydrant 10, up through the wet pipe flow passage 64 and out the nozzle head outlet passage 76. Note that when the supply valve 34 is open, the anti-siphon valve 82 is closed, since the valve cam 94 is moved out of the way. The hydrant 10 is turned off by pushing the handle 96 down, thereby lifting the wet pipe 20 off of the supply valve 34, allowing it to close. The handle 96 forces the valve cam 94 to open the anti-siphon valve 82 which allows the water in the flow passage 64 and the outlet passage 76 to drain down into the collection chamber 74.

It should be understood that the apparatus described above is only exemplary and does not limit the scope of the invention, and that various modifications could be made by those skilled in the art that would fall under the scope of the invention. To apprise the public of the scope of this invention, the following claims are made:

What is claimed is:
1. A hydrant, comprising:
   a handle movable between an on position and an off position;
   an elongated wet pipe movable in the direction of its length by the handle and defining a flow passage between open ends, one of which includes a plunger;
   a well casing receiving the plunger in a sliding seal to define a collection chamber in fluid communication with the flow passage of the wet pipe and a supply opening;

a supply valve actuated by the wet pipe for closing the supply opening when the handle is in the off position; and an anti-siphon valve movable by engagement with the handle between a closed position and an open position for venting the collection chamber to ambient when the supply valve is closed.

2. The hydrant of claim 1, further including a releasable latch mechanism for maintaining the anti-siphon valve in the open position.

3. The hydrant of claim 1, wherein the anti-siphon valve is normally closed.

4. The hydrant of claim 3, wherein the anti-siphon valve is biased closed by a spring.

5. The hydrant of claim 4, wherein the handle abuts the anti-siphon valve to open it against the spring when the handle is in the off position in which the supply valve is closed.

6. The hydrant of claim 1, wherein the handle includes a valve cam positioned to contact and open the anti-siphon valve when the handle is in the off position in which the supply valve is closed.

7. The hydrant of claim 6, wherein the valve cam is a convex surface of the handle.

8. The hydrant of claim 6, wherein the valve cam disengages the anti-siphon valve when the handle is in the on position.

9. The hydrant of claim 1, wherein the supply valve is axially aligned with the wet pipe.

10. The hydrant of claim 1, wherein the supply valve is held normally closed by a spring.

11. The hydrant of claim 10, wherein the supply valve is opened against the spring by contact with the wet pipe.

12. The hydrant of claim 1, wherein the well casing has a cylindrical wall having an outer surface defining an exterior of the hydrant and an inner surface defining the collection chamber.

13. The hydrant of claim 1, wherein when the handle is in the on position the supply valve is open and the anti-siphon valve is closed.

14. The hydrant of claim 1, wherein the supply valve is disposed in an end cap at a bottom of the well casing.

15. The hydrant of claim 1, further including a nozzle head at a top one of the ends of the wet pipe having an outlet in communication with the wet pipe flow passage.

16. The hydrant of claim 15, wherein the anti-siphon valve is disposed within the nozzle head between a vent opening and the outlet.

17. The hydrant of claim 15, wherein the handle is pivotally mounted to the nozzle head.

18. The hydrant of claim 17, further including a link extending between the handle and a fixed member for imparting axial movement to the wet pipe when the handle is pivoted.

19. The hydrant of claim 1, wherein the plunger includes a pusher plate and a cup seal sealing against an inner diameter of the well casing.

20. The hydrant of claim 1, wherein the collection chamber has a volume at least as large as the volume of the wet pipe flow passage when the wet pipe is in an off position in which the supply valve is closed.

21. The hydrant of claim 1, wherein the anti-siphon valve is a replaceable cartridge.

22. The hydrant of claim 21, wherein the cartridge has a tool receptor for installing and removing the cartridge from an upper end of the well casing.

23. A hydrant, comprising:

a handle having a valve cam;

a nozzle head having an outlet passage and a vent opening and a normally closed anti-siphon valve disposed between the vent opening and the outlet passage, the anti-siphon valve being opened by the valve cam when the handle is in an off position;

an elongated wet pipe movable by the handle and having a plunger end and an opposite end connected to the nozzle head in communication with the outlet passage;

a well casing receiving the plunger in a sliding seal to define a collection chamber that is in fluid communication via the wet pipe with the outlet passage of the nozzle head and the vent opening of the nozzle head when the anti-siphon valve is open; and a normally closed supply valve disposed axially at a supply opening in a bottom of the collection chamber that is opened by the wet pipe.

* * * * *